(12) United States Patent (10) Patent No.: US 6,760,660 B2
Morita et al. (45) Date of Patent: Jul. 6, 2004

(54) NAVIGATION APPARATUS HAVING NUMERICAL DISPLAY

(75) Inventors: Hiroyuki Morita, Wako (JP); Shinichi Kawada, Nagaoka (JP); Masaya Yoneyama, Nagaoka (JP); Syunsuke Kariya, Nagaoka (JP); Osamu Ohkubo, Nagaoka (JP); Isao Iwasaki, Nagaoka (JP); Kouei Matsuzaki, Nagaoka (JP)

(73) Assignees: Nippon Seiki Co., Ltd., Hiigata (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/204,563

(22) PCT Filed: Sep. 25, 2001

(86) PCT No.: PCT/JP01/08320

§ 371 (c)(1),
(2), (4) Date: Aug. 22, 2002

(87) PCT Pub. No.: WO02/054011

PCT Pub. Date: Jul. 11, 2002

(65) Prior Publication Data

US 2003/0014184 A1 Jan. 16, 2003

(30) Foreign Application Priority Data

Dec. 28, 2000 (JP) ........................................ 2000-400579

(51) Int. Cl.$^7$ ............................................... G01C 21/26

(52) U.S. Cl. ........................ 701/200; 701/207; 701/209; 340/990; 340/995

(58) Field of Search ................................. 701/207, 209, 701/211, 200; 340/990, 995

(56) References Cited

U.S. PATENT DOCUMENTS 4,086,632 A * 4/1978 Lions .......................... 701/210
4,212,067 A   7/1980 Henderson ................... 701/300
6,453,236 B1 * 9/2002 Aoki .......................... 701/211

FOREIGN PATENT DOCUMENTS

JP          8-5721      1/1996
JP          8-16992     1/1996
JP          9-134368    5/1997
JP         11-257988    9/1999

* cited by examiner

Primary Examiner—Marthe Y. Marc-Coleman
(74) Attorney, Agent, or Firm—McDermott, Will & Emery (57) ABSTRACT

A navigation apparatus wherein "latitude" and "longitude" are used as coordinate information on a set location. It comprises a display device 6 which includes, at least, digital displaying patterns 301–303 and digital displaying patterns 304–305 for numerically displaying values of "degrees" and "minutes" of each of the "latitude " and"longitude", respectively, an input device which sets the values, a storage device which stores therein the coordinate information on the set location, and a control device by which, in a case where the displays of "degrees" by the digital displaying patterns 301–303 of the display device 6 have been inputted as or validated at a predetermined value by the input device, the displays of "minutes" by the digital displaying patterns 304–305 of the display device 6 are automatically changed to a preset value, and by which, when the displays of "degrees" by the digital displaying patterns 301–303 of the display device 6 have been validated at the predetermined value by the input device, the displays of "minutes" by the digital displaying patterns 304–305 of the display device 6 are validated at the preset value, and the respective values are stored in the storage device as the coordinate information on the set location.

7 Claims, 7 Drawing Sheets

PRIOR ART

NAVIGATION APPARATUS HAVING NUMERICAL DISPLAY

TECHNICAL FIELD

This invention relates to a navigation apparatus which is used in a state where it is carried by a user or where it is mounted on a mobile object, for example, a vehicle.

BACKGROUND OF THE INVENTION

The official gazette of Japanese Patent Laid-Open No. 16992/1996, for example, discloses a navigation apparatus which is mounted on a vehicle as a route information display apparatus.

Figure 15:
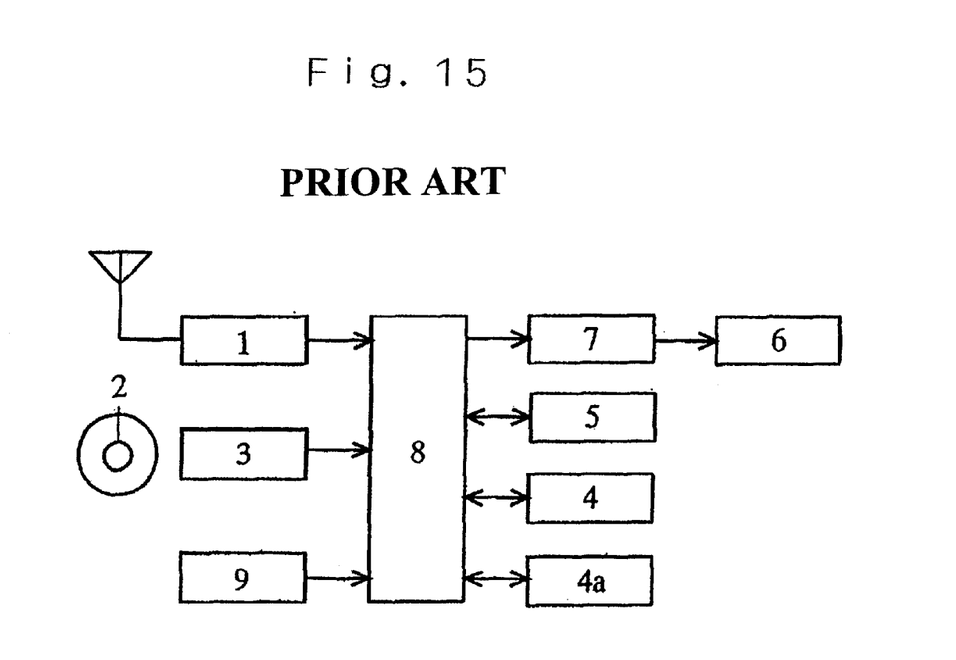
FIG. 15 is a block diagram for explaining the construction of a navigation apparatus.

As shown in FIG. 15, the navigation apparatus comprises a reception device (positioning device) 1 which receives an electric wave from a GPS satellite and outputs the positional data of the current location, a read device 3 which reads map data from a map information storage medium 2 such as CD-ROM, a buffer memory 4 in which the map data is stored, a displaying image memory 5 in which image data forming the bases of depiction patterns to be stated below are held stored, a display controller 7 which causes a display device 6, such as CRT or LCD, to display the depiction pattern corresponding to the map data by the use of the image data of the displaying image memory 5, and a control device 8, such as microcomputer, which controls the whole system, wherein the content of the displaying image memory 5 is updated in accordance with the change of the current position, and the display on the display device 6 is also changed accordingly. Incidentally, an input device 9, such as keyboard, which enables a user, such as driver, to perform various operations such as setting a starting location and a destination location and recording drive data is connected to the control device 8.

Besides, the official gazette of Japanese Patent Laid-Open No. 5721/1996 discloses an apparatus in which another buffer memory 4a is prepared, and map data different from that of the buffer memory 4 is copied, whereby a route selection spot, for example, an intersection having come near ahead is displayed in detail (for example, on enlarged scale) by the display device 6, so as to indicate a running direction.

In setting any desired spot as a set location in the navigation apparatus of this type, there are the construction (the former) wherein the spot is sought on a map and is set as explained above, and also a construction (the latter) wherein, as disclosed in the official gazette of Japanese Patent Laid-Open No. 257988/1999, the spot is set by inputting the values of "latitude" and "longitude" being terrestrial coordinate information as are introduced by various media such as magazines, television broadcasting and Internet sites.

The former is effective in case where the place of the set location is known, but the latter is employed in a case where only the coordinate information items are available.

The present invention has for its object to provide a navigation apparatus which realizes the facility of operations in setting the set location with the coordinate information.

Besides, in case of displaying the coordinate information, it is necessary for displaying the "latitude" to prepare a design which expresses the "north latitude" or the "south latitude", and a design which consists of, at least, two-digit numeral expressive of the value of "degrees" and two-digit numeral expressive of the value of "minutes", while it is necessary for displaying the "longitude" to prepare a design which expresses the "east longitude" or the "west longitude", and a design which consists of, at least, three-digit numeral expressive of the value of "degrees" and two-digit numeral expressive of the value of "minutes".

To prepare all of such designs within the display space of the identical display device 6 is liable to deteriorate in visibility because the size of each of the designs is liable to be limited and to become small. To the contrary, to set the size of each of the designs at a sufficient size in consideration of the visibility is unfavorable because a proportion for the coordinate information in the display space is increased to impose restrictions on the other displays.

The present invention has for its object to provide a navigation apparatus in which, in displaying the coordinate information, designs for the other displays are used in common, whereby a good visibility of the designs for the display of the coordinate information is ensured with the proportion of these designs suppressed.

DISCLOSURE OF THE INVENTION

In order to accomplish the objects, as defined in claim 1, the navigation apparatus of the present invention consists in a navigation apparatus wherein "latitude" and "longitude" are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been validated at a predetermined value by operating said input device, the display of "minutes" by said design of said display device is automatically changed to a preset value, and by which, when said display of "degrees" by said design of said display device has been validated at the predetermined value by said input device, said display of "minutes" by said design of the display device is validated at said preset value, and the respective values are stored in said storage device as said coordinate information on said set location.

Besides, as defined in claim 2, the navigation apparatus of the present invention consists in a navigation apparatus wherein "latitude" and "longitude" are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been inputted as a predetermined value by operating said input device, the display of "minutes" by said design of said display device is automatically changed to a preset value, and by which, when said display of "degrees" by said design of said display device has been validated at the predetermined value by said input device, said display of "minutes" by said design of the display device is validated at said preset value, and the respective values are stored in said storage device as said coordinate information on said set location.

Especially, in claim 1 or claim 2, as defined in claim 3, the navigation apparatus is characterized in that said predetermined value is "90" for said "latitude" and "180" for said "longitude", while said preset value is "00" for both said "latitude" and said "longitude".

Besides, as defined in claim 4, the navigation apparatus of the present invention consists in a navigation apparatus wherein "latitude" and "longitude" are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been inputted as or validated at a predetermined value having "0" as a value of a lowermost digit by operating said input device, the display of "minutes" by said design of said display device is automatically changed to "00", and by which, when said display of "minutes" has been validated at a desired value by said input device, the respective values are stored in said storage device as said coordinate information on said set location. Besides, as defined in claim 5, the navigation apparatus of the present invention consists in a navigation apparatus wherein "latitude" and "longitude" are used as coordinate information on a set location, characterized by comprising a positioning device which measures a current position of a mobile object, an input device which sets the set location, a storage device which stores therein the coordinate information on said set location, a display device which includes an azimuth display area for displaying an azimuthal direction in accordance with an azimuth signal, and a distance display area for numerically displaying a movement distance and values of, at least, "degrees" and "minutes" of the "latitude" and the "longitude", and a control device which obtains said azimuthal direction of said set location on the basis of signals from said positioning device and said input device and then outputs said azimuth signal; which calculates a distance between the current position and said set location and then outputs a distance signal, by which, in a case where the display of "degrees" on said display device has been inputted as or validated at a predetermined value by operating said input device, the display of "minutes" on said display device is automatically changed to a preset value, and by which, when said display of "degrees" on said display device has been validated at the predetermined value by said input device, said display of "minutes" on said display device is validated at the preset value, and the respective values are stored in said storage device as said coordinate information on said set location.

Besides, as defined in claim 6, the navigation apparatus of the present invention consists in a navigation apparatus wherein "latitude" and "longitude" are used as coordinate information on a set location, characterized by comprising a positioning device which measures a current position of a mobile object, an input device which sets the set location, a storage device which stores therein the coordinate information on said set location, a display device which includes an azimuth display area having a plurality of azimuth indication patterns arranged radiately so that an outer edge defined by their tips may form a circle or a circular arc, so as to display an azimuthal direction in accordance with an azimuth signal, and a distance display area for numerically displaying a movement distance and values of, at least, "degrees" and "minutes" of the "latitude" and the "longitude", and a control device which obtains the azimuthal direction of said set location on the basis of signals from said positioning device and said input device and then outputs the azimuth signal, which calculates a distance between the current position and said set location and then outputs a distance signal, by which, in a case where the display of "degrees" on said display device has been inputted as or validated at a predetermined value by operating said input device, the display of "minutes" on said display device is automatically changed to a preset value, and by which, when said display of "degrees" on said display device has been validated at the predetermined value by said input device, said display of "minutes" on said display device is validated at the preset value, and the respective values are stored in said storage device as said coordinate information on said set location.

Especially, in claim 5 or claim 6, as defined in claim 7, the navigation apparatus is characterized in that said display device includes designs by which, in a case where the "degrees" and "minutes" of said "latitude" are being displayed in the distance display area, the azimuth display area presents a display for indicating the "north latitude" or "south latitude" of said "latitude", while in a case where the "degrees" and "minutes" of said "longitude" are being displayed in said distance display area, said azimuth display area presents a display for indicating the "east longitude" or "west longitude" of said "longitude".

BEST MODE FOR CARRYING OUT THE INVENTION

The present invention will be described in conjunction with an aspect of performance shown in FIG. 1 through FIG. 14. Featuring parts according to the present invention shall be chiefly described below, and parts identical or corresponding to those of the prior art shall be assigned the same numerals and signs as in the prior art and FIG. 15 and be omitted from description.

Figure 1:
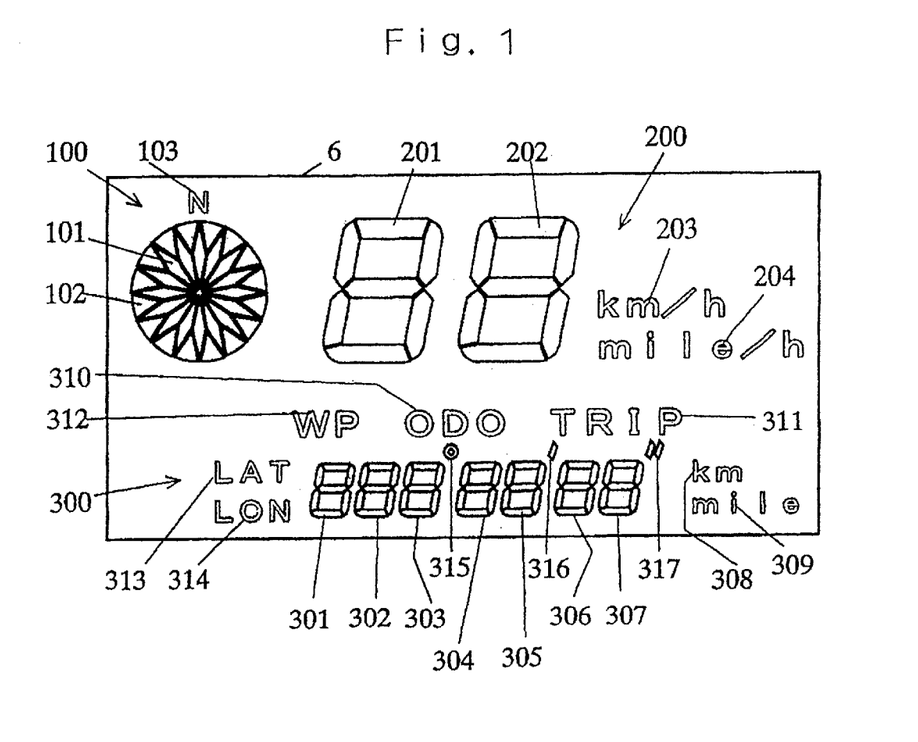
FIG. 1 is a plan view for explaining a display device according to an aspect of performance of the present invention.

A display device 6 in this aspect of performance is constructed of liquid-crystal display elements of dot matrix type so as to be capable of presenting through the operations of input means 9 by a user, a display aspect which has the respective designs of an azimuth display area 100, a speed display area 200 and a distance display area 300 as shown in FIG. 1; a display aspect, not shown, in which the current position, the set location etc. are indicated on a map; and so forth.

The azimuth display area 100 of analog scheme is constituted by a plurality of arrow-shaped azimuth indication patterns 101 which radiate in all directions at equal intervals in order to display a first azimuthal direction being a running direction correspondent to the current position on the basis of a signal delivered from a reception device 1, and/or a second azimuthal direction being the direction of the set location in correspondence with the current position based on said signal and the set location (for example, target location) set with the input device 9; auxiliary indication patterns 102 which lie between the respectively adjacent azimuth indications 101 and which are a plurality of triangles annularly arranged in correspondence with divided azimuthal directions; and a letter-N pattern 103 which lies at a top part and which indicates the "north" of azimuth. The azimuth indication patterns 101 are provided in proportion to the number of divisions of the azimuth. Since, in this aspect of performance, the azimuth is divided by 16, the patterns 101 are in the number of 16, and they are selectively brought into displayed states in order to indicate the first and second azimuthal directions. The auxiliary indication patterns 102 are in the number of 16 so as to be situated and interposed between the respectively adjacent azimuth indication patterns 101, and only those of the patterns 102 which lie on both the sides of the azimuth indication pattern 101 opposite to the azimuthal direction indicated by the azimuth indication pattern 101 are brought into displayed states. The letter-N pattern 103 is brought into a displayed state in a "North Up" display mode in which the "north" of the azimuth is set just above, but it is brought into a non-displayed state in, for example, a "Way Up" display mode in which the running direction is set just above. The alteration of the display modes is made with the input device 9.

The speed display area 200 of digital scheme is constituted by two patterns for digital displays 201, 202 in each of which any of numerals "0"–"9" is displayed by seven segments arranged in the shape of FIG. 8, a pattern for a kilometer-unit display 203 which displays a unit sign "km/h", and a pattern for a mile-unit display 204 which is activated alternatively to the kilometer-unit displaying pattern 203 so as to display a unit sign "mile/h".

The distance display area 300 of digital scheme is constituted by seven patterns for digital displays 301–307 in each of which any of numerals "0"–"9" is displayed by seven segments arranged in the shape of figure-8, a pattern for a kilometer-unit display 308 which displays a unit sign "km", a pattern for a mile-unit display 309 which is activated alternatively to the kilometer-unit displaying pattern 308 so as to display a unit sign "mile", an odo pattern 310 which displays "ODO" for indicating that the distance display area 300 corresponds to an odometer, a trip pattern 311 which is activated alternatively to the odo pattern 310 so as to display "TRIP" for indicating that the distance display area 300 corresponds to a tripmeter, a way point pattern 312 which is activated alternatively to the odo pattern 310 and trip pattern 311 so as to display "WP" for indicating that the information on the set location is displayed in the distanced is play area 300, a latitude pattern 313 which is activated during the display of the way point pattern 312 so as to display "LAT" for indicating that latitude is displayed in the distance display area 300, a longitude pattern 314 which is activated alternatively to the odo pattern 310, trip pattern 311 and latitude pattern 313 so as to display "LON" for indicating that longitude is displayed in the distance display area 300, a degree pattern 315 which is activated simultaneously with the latitude pattern 313 or longitude pattern 314 in order to indicate that the upper three digits of the digital displaying patterns 301–307 are a value in "degrees (°)", a minute pattern 316 which is similarly activated in order to indicate that the middle two digits of the digital displaying patterns 301–307 are a value in "minutes (')", and a second pattern 317 which is similarly activated in order to indicate that the lower two digits of the digital displaying patterns 301–307 are a value in "seconds (")".

Figure 2:
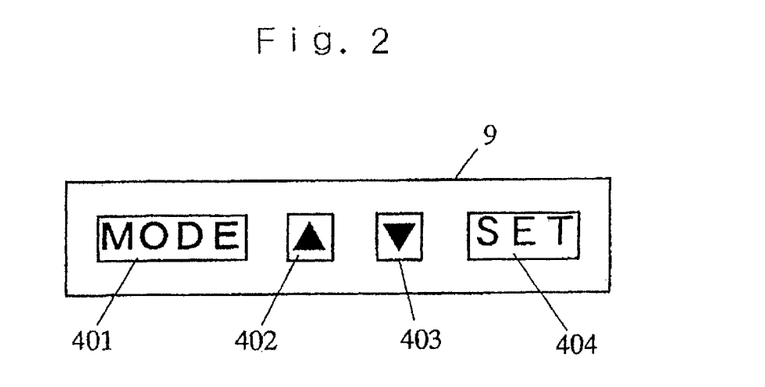
FIG. 2 is a plan view for explaining an input device according to the same.

The input device 9 has such functions as changing-over the display aspects or display modes of the display device 6 (changeover), and storing the set location in a storage device 4 while it is being confirmed on the display device 6 (setting) In FIG. 2, the input device 9 includes a mode selection switch 401 for selecting the changeover or setting, an increment switch 402 and a decrement switch 403 for causing a control device 8 to change any item or value in any of the azimuth display area 100, speed display area 200 and distance display area 300 in accordance with a predetermined program, when the setting has been selected by the mode selection switch 401 (the increment switch 402 is a switch for changing the items in a forward direction or raising the values, while the decrement switch 403 is a switch for changing the items in a reverse direction or lowering the values), and a set switch 404 for validating the changed item or value.

The storage device 4 has a storage area in which a spot is stored as the set location each time the user operates the input device 9 at his/her own will, and from which the user can invoke the set location for utilization at any desired time as long as the storage is not released. The number of such set locations to be stored may be any, and in case of storing 10 spots by way of example, 10 channels are included. Incidentally, although the channels may well be displayed by the display device 6 in accordance with the operations of the input device 9, such a display is omitted in this aspect of performance.

Next, concrete examples of Use in this aspect of performance will be described.

When the user drives after setting a route with the input device 9, the control device 8 obtains the first azimuthal direction being the running direction correspondent to the current position on the basis of signals from the reception device 1, and it also obtains the second azimuthal direction being the direction of the destination location from the current position based on said signal and the destination location set by the input device 9. The azimuthal directions are updated by the program of the control device 8 or at regular timings set by the input device 9, whereby the newest azimuth information items are outputted as signals.

Figure 3:
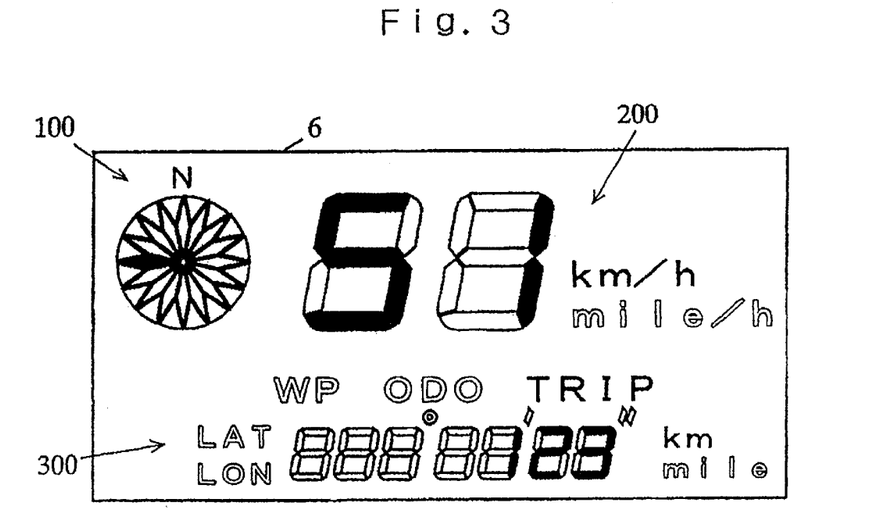
FIG. 3 is a plan view for explaining a display example of the display device according to the same.

Usually, as shown in FIG. 3, the display device 6 displays the running direction in the azimuth display area 100, displays a running speed in the speed display area 200 and presents the display as the odometer or tripmeter in the distance display area 300 in accordance with the signals delivered from the control device 8.

The user operates the input device 9 beforehand or at any spot when he/she desires to keep the spot in mind as the set location. Thus, he/she stores the positional data of the spot in the channel of the storage device 4 on the basis of the information from the reception device 1, so as to use the set location as the destination location. Besides, the user selects any of the channels of the storage device 4 and invokes any of such set locations by operating the input device 9, thereby to determine the destination location.

Figure 4:
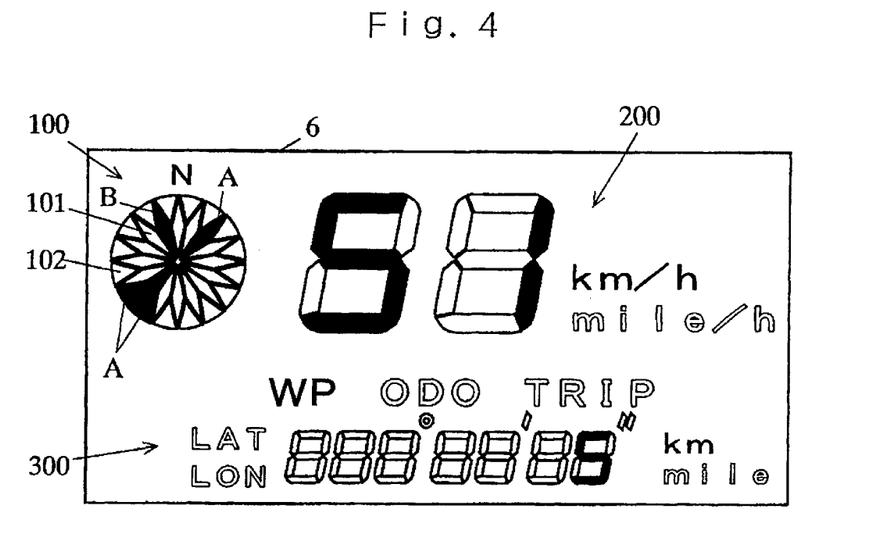
FIG. 4 is a plan view for explaining another display example of the display device according to the same.
Figure 5:
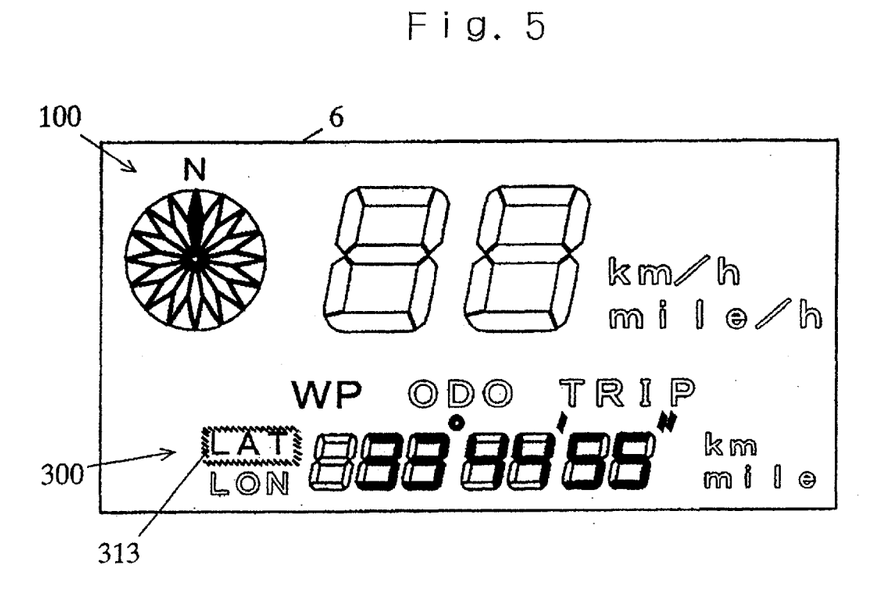
FIG. 5 is a plan view for explaining the setting of latitude on the display device according to the same.

In this state, as shown in FIG. 4, the display device 6 simultaneously displays the first and second azimuthal directions in the north-up display mode by way of example, in the azimuth display area 100 in accordance with the signals delivered from the control device 8. In order to permit the discrimination between the first azimuthal direction and the second azimuthal direction on this occasion, the arrow of the latter is shorter as compared with that of the former. Referring to the figure, it is the first azimuthal direction in the displayed state that is designated by letter A, and "northeast" is indicated. Besides, it is the second azimuthal direction in the displayed state that is designated by letter B, and "north-northwest" is indicated. Incidentally, it is as stated before that the display mode of the azimuth display area 100 can be selected by the operation of the input device 9.

In case of setting the set values (the destination location) by directly inputting the "latitude" and "longitude" which are the terrestrial coordinate information, the user operates the mode selection switch 401 of The input device 9. Although it has been stated before that the changeover or the setting is performed by the operation of the mode selection switch 401, the setting of the set location is part of the setting.

An instruction is sent to the control device 8 so as to perform the setting, by the operation, for example, depression of the mode selection switch 401. Incidentally, in order to notify it to the user by the display of the display device 6 that the setting is possible, the display of the display device 6 is changed in accordance with the operation of the mode selection switch 401. By way of example, it is notified by the flickering of the way-point pattern 312 that the setting is possible.

When the setting has become possible by the operation of the mode selection switch 401, the display device 6 notifies it by the flickering of the latitude pattern 313 that the setting of the "latitude" is possible. On this occasion, the digital displaying patterns 302–307 are displaying the value of the "latitude" of the current position (Since the value of the latitude is 90 degrees at the maximum, the digital displaying pattern 301 at the uppermost digit is held in the non-displayed state and is not used. In a case where the value of "degrees" is one digit or two digits (only the "longitude") in each of the "latitude" and the "longitude", its upper digit is held in the non-displayed state, and numerical value "0" is not displayed therefor.), or they are displaying the value of the "latitude" of the set location in case of revising the set location set in the past (refer to FIG. 5).

Figure 6:
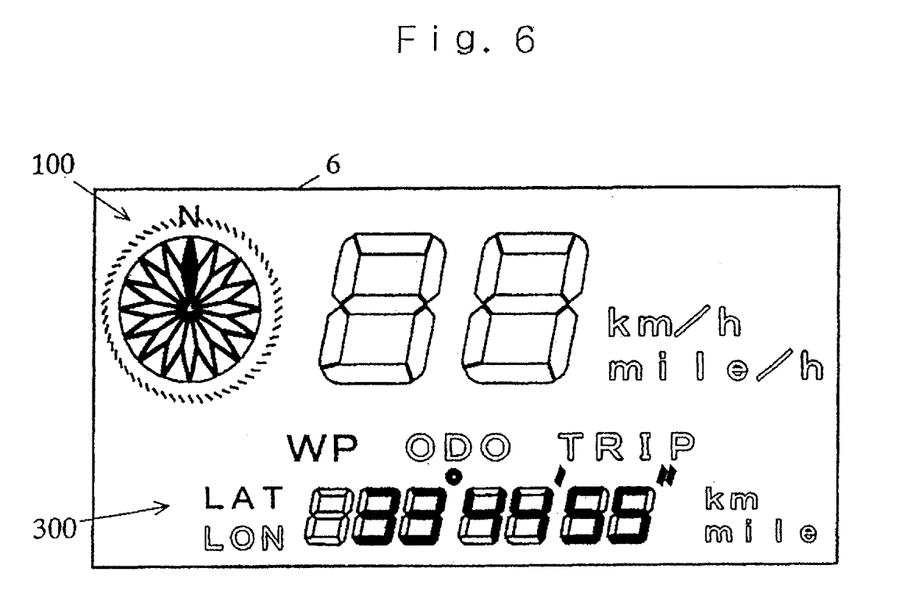
FIG. 6 is a plan view for explaining the setting of the latitude on the display device according to the same.
Figure 7:
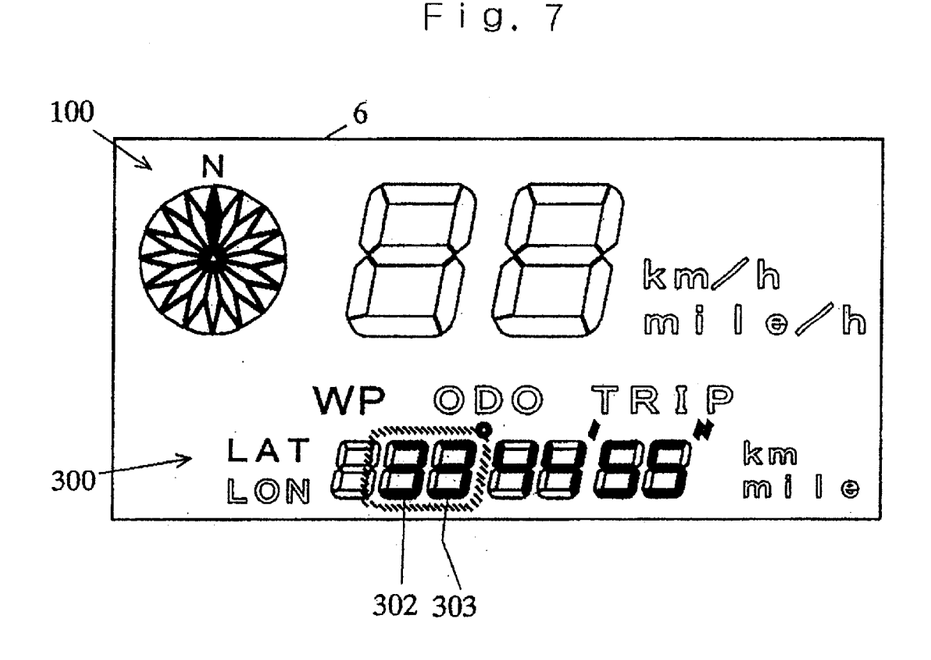
FIG. 7 is a plan view for explaining the setting of the latitude on the display device according to the same.
Figure 8:
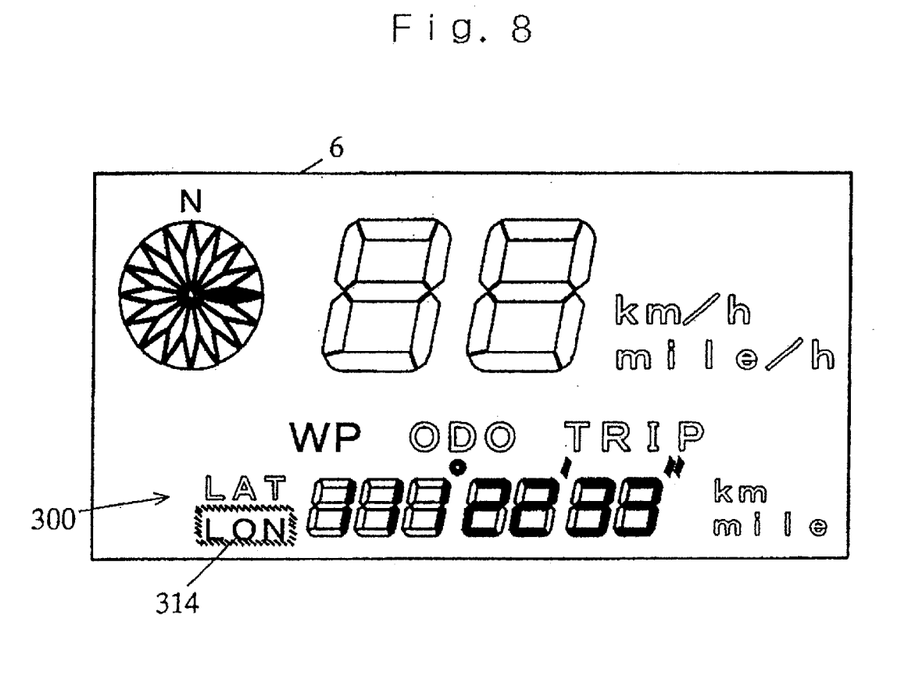
FIG. 8 is a plan view for explaining the setting of longitude on the display device according to the same.

In case of setting the "latitude", the latitude pattern 313 is brought Into a lit-up state by operating, for example, depressing the set switch 404 of the input device 9, whereupon the azimuth display area 100 is flickered for the purpose of prompting the user to select either the "north latitude" or the "south latitude" (refer to FIG. 6). In case of setting the "longitude", the longitude pattern 314 is flickered in such a way that any of the mode selection switch 401, increment switch 402 and decrement switch 403 is operated, for example, depressed under the flickering state of the latitude pattern 313, and this will be explained later. Each time the user operates the increment switch 402 or decrement switch 403 of the input device 9 under the flickering state of the analog azimuth display area 100, the display of the azimuth display area 100 indicates the north (the former) or indicates the south (the latter). The set switch 404 is operated on the occasion of the former in setting the "north latitude" or on the occasion of the latter in setting the "south latitude", whereby the setting of the "north latitude" or "south latitude" is validated to bring the azimuth display area 100 into the lit-up state.

Thereafter, regarding the value of the "latitude", while the digital displaying patterns 302–303 indicative of the value of "degrees" are in the flickering states (refer to FIG. 7), a numerical value is inputted by operating the increment switch 402 or the decrement switch 403 and is subsequently validated by operating the set switch 404; while the digital displaying patterns 304–305 indicative of the value of "minutes" are in the flickering states, a numerical value is inputted by operating the increment switch 402 or the decrement switch 403 and is subsequently validated by operating the set switch 404; and while the digital displaying patterns 306–307 indicative of the value of "seconds" are in the flickering states, a numerical value is inputted by operating the increment switch 402 or the decrement switch 403 and is subsequently validated by operating the set switch 404. Thus, the digital displaying patterns 302–303, 304–305 and 306–307 indicative of the values of "degrees", "minutes" and "seconds", respectively, are brought into the lit-up states in succession, and the setting of the latitude is completed.

Besides, the setting of the "longitude" is made by performing operations to be explained below, while the longitude pattern 314 is in the flickering state midway of the foregoing setting of the "latitude", or while the longitude pattern 314 indicating that the setting of the "longitude" is possible is in the flickering state after the setting of the "latitude" has been completed. On this occasion, the digital displaying patterns 301–307 are displaying the value of the "longitude" of the current position, or they are displaying the value of the "longitude" of the set location in case of revising the set location set in the past (refer to FIG. 8).

Figure 9:
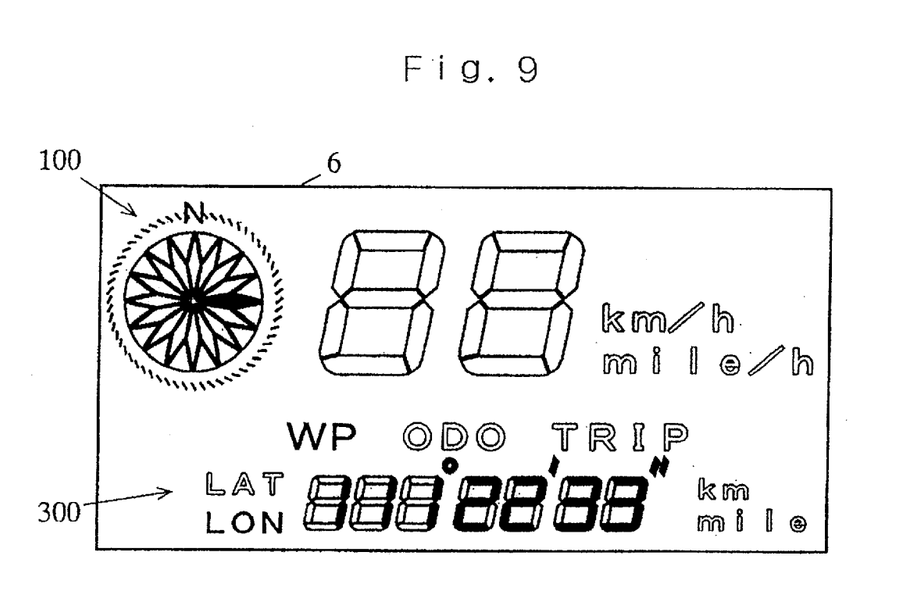
FIG. 9 is a plan view for explaining the setting of the longitude on the display device according to the same.
Figure 10:
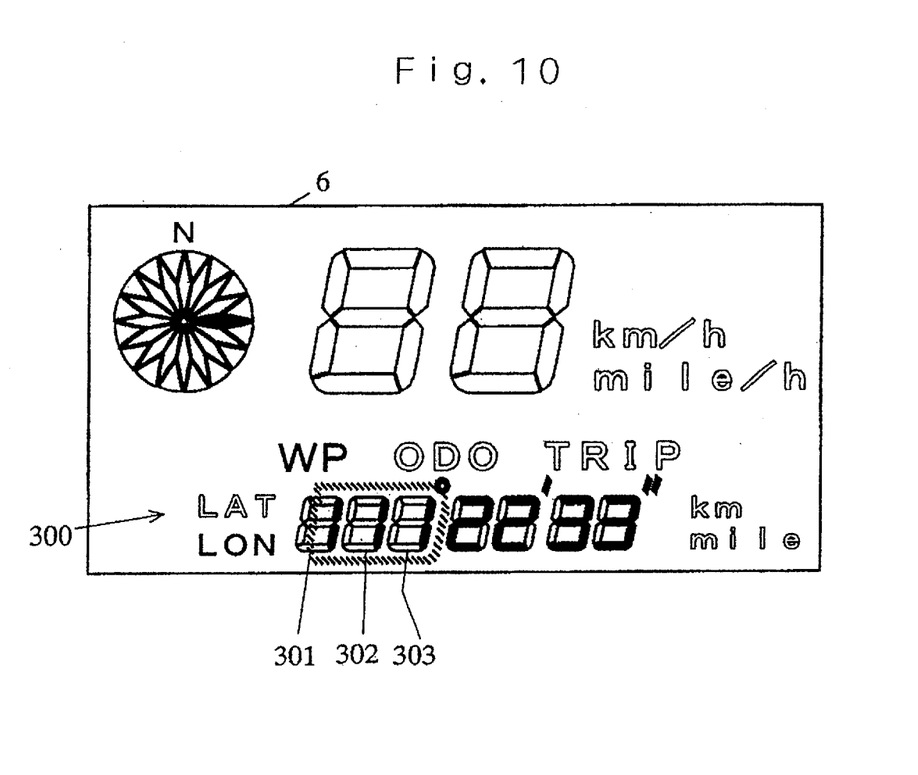
FIG. 10 is a plan view for explaining the setting of the longitude on the display device according to the same.
Figure 11:
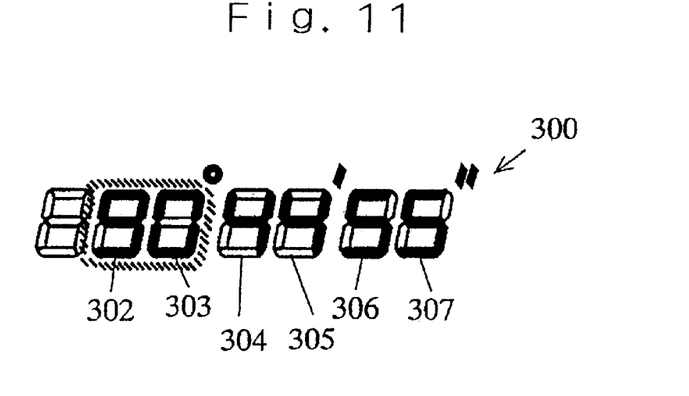
FIG. 11 is a plan view for explaining the setting of the latitude on the display device according to the same.
Figure 12:
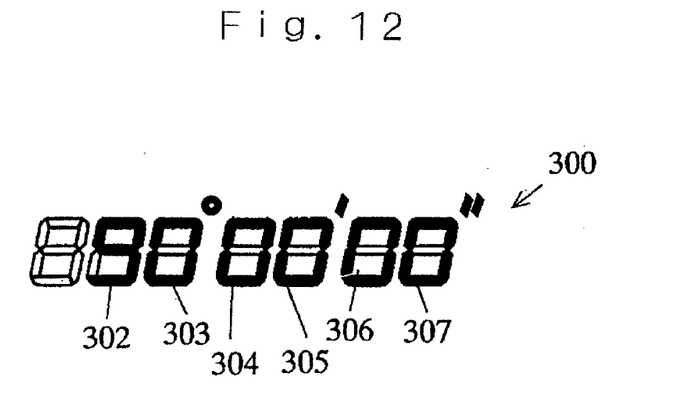
FIG. 12 is a plan view for explaining the setting of the latitude on the display device according to the same.
Figure 13:
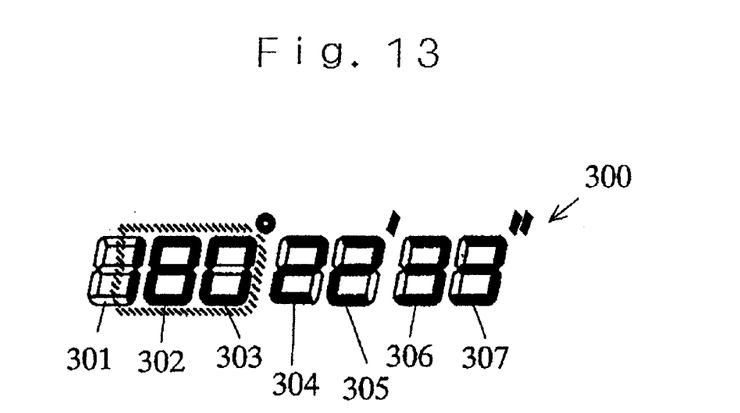
FIG. 13 is a plan view for explaining the setting of the longitude on the display device according to the same.
Figure 14:
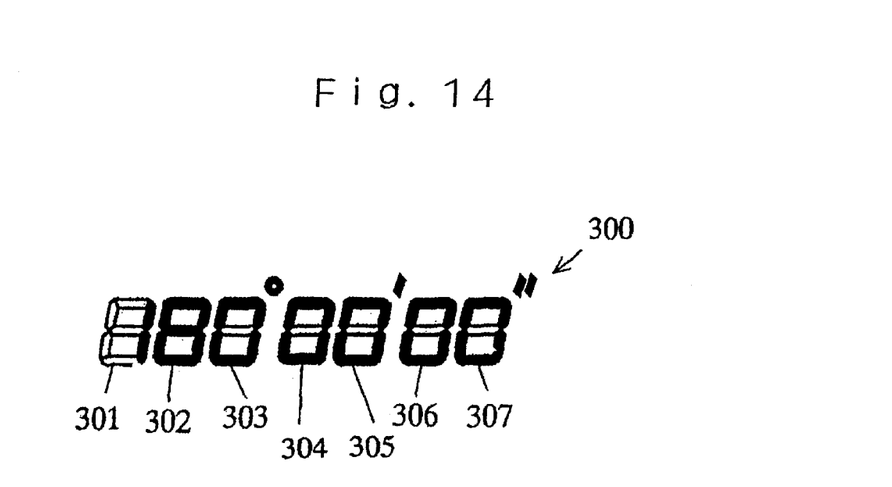
FIG. 14 is a plan view for explaining the setting of the longitude on the display device according to the same.

In case of setting the "longitude", the set switch 404 of the input device 9 is operated, thereby to bring the longitude pattern 314 into the lit-up state, whereupon the azimuth display area 100 is flickered for the purpose of prompting the user to select either the "east longitude" or the "west longitude" (refer to FIG. 9). Each time the user operates the increment switch 402 or decrement switch 403 of the input device 9 under the flickering state of the analog azimuth display area 100, the display of the azimuth display area 100 indicates the east (the former) or indicates the west (the latter). The set switch 404 is operated on the occasion of the former in setting the "east longitude" or on the occasion of the latter in setting the "west longitude", whereby the setting of the "east longitude" or "west longitude" is validated to bring the azimuth display area 100 into the lit-up state.

Thereafter, regarding the value of the "longitude", while the digital displaying patterns 301–303 indicative of the value of "degrees" are in the flickering states (refer to FIG. 10), a numerical value is inputted by operating the increment switch 402 or the decrement switch 403 and is subsequently validated by operating the set switch 404; while the digital displaying patterns 304–305 indicative of the value of "minutes" are in the flickering states, a numerical value is inputted by operating the increment switch 402 or the decrement switch 403 and is subsequently validated by operating the set switch 404; and while the digital displaying patterns 306–307 indicative of the value of "seconds" are in the flickering states, a numerical value is inputted by operating the increment switch 402 or the decrement switch 403 and is subsequently validated by operating the set switch 404. Thus, the digital displaying patterns 301–303, 304–305 and 306–307 indicative of the values of "degrees", "minutes" and "seconds", respectively, are brought into the lit-up states in succession, and the setting of the longitude is completed.

Meanwhile, the upper limit of the values of the "latitude" is 90 degrees in both the "north latitude" and the "south latitude". When this value is validated after operating the increment switch 402 or decrement switch 403 of the input device 9 under the flickering states of the digital displaying patterns 302–303 indicative of the value of "degrees", any values are respectively held displayed by the digital displaying patterns 304–305 indicative of the value of "minutes" and the digital displaying patterns 306–307 indicative of the value of "seconds" at that moment (refer to FIG. 11), and hence, operations for altering both the values to "00" must be performed. In this aspect of performance, however, when under the flickering states of the digital displaying patterns 302–303 indicative of the value of "degrees", the numerical value "90" is inputted by operating the increment switch 402 or the decrement switch 403 and is subsequently validated by operating the set switch 404, the digital displaying patterns 304–305 indicative of the value of "minutes" and the digital displaying patterns 306–307 indicative of the value of "seconds" are automatically changed to display the numerical value "00" and to be validated. That is, at the same time that the displays of the digital displaying patterns 302–303 indicative of the value of "degrees" are validated at the numerical value "90" being a predetermined value, the digital displaying patterns 304–305 indicative of the value of "minutes" and the digital displaying patterns 306–307 indicative of the value of "seconds" are validated at the numerical value "00" being a preset value (refer to FIG. 12), whereby subsequent alterations are made impossible, and the setting of the "latitude" is completed. Accordingly, the inputs and validations of "minutes" and "seconds" can be omitted.

Besides, the upper limit of the values of the "longitude" is 180 degrees in both the "east longitude" and the "west longitude". When this value is validated after operating the increment switch 402 or decrement switch 403 of the input device 9 under the flickering states of the digital displaying patterns 301–303 indicative of the value of "degrees", any values are respectively held displayed by the digital displaying patterns 304–305 indicative of the value of "minutes" and the digital displaying patterns 306–307 indicative of the value of "seconds" at that moment (refer to FIG. 13), and hence, operations for altering both the values to "00" must be performed. In this aspect of performance, however, when under the flickering states of the digital displaying patterns 301–303 indicative of the value of "degrees", the numerical value "180" is inputted by operating the increment switch 402 or the decrement switch 403 and is subsequently validated by operating the set switch 404, the digital displaying patterns 304–305 indicative of the value of "minutes" and the digital displaying patterns 306–307 indicative of the value of "seconds" are automatically changed to display the numerical value "00" and to be validated. That is, at the same time that the displays of the digital displaying patterns 301–303 indicative of the value of "degrees" are validated at the numerical value "180" being a predetermined value, the digital displaying patterns 304–305 indicative of the value of "minutes" and the digital displaying patterns 306–307 indicative of the value of "seconds" are validated at the numerical value "00" being a preset value (refer to FIG. 14), whereby subsequent alterations are made impossible, and the setting of the "longitude" is completed. Accordingly, the inputs and validations of "minutes" and "seconds" can be omitted.

In this manner, it is restrained to input any numerical value exceeding "90" degrees for the "latitude" and any numerical value exceeding "180" degrees for the "longitude", whereby the facility of the operations in the case of setting the set location with the coordinate information can be realized.

Moreover, a design which is formed of the digital displaying patterns 301–307 and which is used in the case of displaying the distance of the odometer or tripmeter is used in common as a design which is used in the case of displaying the numerical value of the coordinate information, and a design which is formed of the azimuth display area 100 is used in common as a design which display the "north latitude" and "south latitude" of the "latitude" and the "east longitude" and "west longitude" of the "longitude", whereby a good visibility of the designs for the display of the coordinate information can be ensured with the proportion of the designs for the display of the coordinate information suppressed.

Incidentally, the foregoing aspect of performance has been described about the construction wherein, when the displays of the digital displaying patterns 301–303 indicative of the value of "degrees" are validated at the corresponding predetermined numerical value "90" or "180" by the operation of the set switch 404 of the input device 9 in the setting of each of the "latitude" and the "longitude", the digital displaying patterns 304–305 indicative of the value of "minutes" and the digital displaying patterns 306–307 indicative of the value of "seconds" are automatically changed to be validated at the preset numerical value "00". It is also allowed, however, to employ a construction wherein, at the time of the input before the validation by the operation of the set switch 404, that is, at the time when the displays of the digital displaying patterns 301–303 indicative of the value of "degrees" have been changed to the corresponding predetermined numerical value "90" or "180" by the operation of the increment switch 402 or decrement switch 403 of the input device 9, the digital displaying patterns 304–305 indicative of the value of "minutes" and the digital displaying patterns 306–307 indicative of the value of "seconds" are automatically changed to display the preset numerical value "00", whereupon the values of "minutes" and "seconds" are validated at the same time that the value of "degrees" is validated by operating the set switch 404. Thus, the inputs and validations of "minutes" and "seconds" can be omitted.

Besides, although "90" and "180" are respectively employed as the predetermined values for the "latitude" and the "longitude", "0" which is the value of the lowermost digit of "degrees" may well be employed as the predetermined value for both the "latitude" and the "longitude", so that at the time when this value has been inputted or validated, the values of "minutes" and "seconds" are automatically changed to "00" and are thereafter brought to desired values by the input device 9 (the desired values are "00" after the changes or values desired by the user). In this case, "minutes" and "seconds" become "00" in "10" units of "degrees" in addition to the above function, and the user can be aware of delimiters.

Besides, the value of the "seconds" of each of the "latitude" and "longitude" may well be three digits in which one decimal place is added. In order to incarnate this contrivance in the foregoing aspect of performance, another similar digital displaying pattern is additionally provided next to the digital displaying pattern 307.

Besides, it is also possible to construct a navigation apparatus of simple type in which the values of the "seconds" of the "latitude" and "longitude" are not used. In order to incarnate this contrivance in the foregoing aspect of performance, the digital displaying patterns 306–307 Indicative of the value of "seconds" are not used in common.

Besides, as a design for displaying the "north latitude" and "south latitude" of the "latitude" and the "east longitude" and "west longitude" of the "longitude", an azimuth display area which indicates azimuthal directions by letters can be employed instead of the azimuth display area 100 of analog scheme which has the plurality of azimuth indication patterns 101 radiately arranged so that an outer edge defined by their tips may form a circle or a circular arc. However, the azimuth display area 100 of analog scheme is intuitively recognized with ease.

Incidentally, the present invention is not restricted to the foregoing aspect of performance. By way of example, when the display means 6 is constructed of liquid-crystal display elements of multi color type capable of presenting a display based on the combination of a large number of dots, the construction contributes to the enhancement of outward appearance.

Besides, in a navigation apparatus which has only the construction of setting any desired spot by inputting the values of the "latitude" and "longitude" that are the terrestrial coordinate information, and which does not have the construction of seeking the spot on a map and setting it as a set location; the map information storage medium 2, the read device 3 for reading map data there from (refer to FIG. 15 as to both the constituents), etc. can be omitted, and the navigation apparatus contributes to the simplification of the whole construction.

INDUSTRIAL APPLICABILITY

In a navigation apparatus wherein a set location being any desired spot is set by the use of "latitude" and "longitude" being terrestrial coordinate information, this invention can provide a navigation apparatus of high conveniency in which the inputs of a numerical value exceeding "90" degrees for the "latitude" and a numerical value exceeding "180" degrees for the "longitude" by way of example are restrained, whereby the facility of operations in the case of setting the set location by the use of the coordinate information can be realized.

Moreover, this invention can provide a navigation apparatus of high visibility in which designs for use in case of displaying the coordinate information are used in common with designs for the other displays, whereby a good visibility of the designs for displaying the coordinate information can be ensured with the proportion of these designs suppressed.

What is claimed is:

1. A navigation apparatus wherein "latitude" and "longitude" are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been validated at a predetermined value by operating said input device, the display of "minutes" by said design of said display device is automatically changed to a preset value, and by which, when said display of "degrees" by said design of said display device has been validated at the predetermined value by said input device, said display of "minutes" by said design of the display device is validated at said preset value, and the respective values are stored in said storage device as said coordinate information on said set location.

2. A navigation apparatus wherein "latitude" and "longitude" are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been inputted as a predetermined value by operating said input device, the display of "minutes" by said design of said display device is automatically changed to a preset value, and by which, when said display of "degrees " by said design of said display device has been validated at the predetermined value by said input device, said display of "minutes" by said design of the display device is validated at said preset value, and the respective values are stored in said storage device as said coordinate information on said set location.

3. A navigation apparatus as defined in claim 1 or claim 2, characterized in that said predetermined value is "90" for said "latitude" and "180" for said "longitude", while said preset value is "00" for both said "latitude" and said "longitude".

4. A navigation apparatus wherein "latitude" and "longitude " are used as coordinate information on a set location, characterized by comprising a display device which includes a design for numerically displaying values of, at least, "degrees" and "minutes" of each of the "latitude" and "longitude", an input device which sets the values by employing the design of said display device, a storage device which stores therein the coordinate information on the set location, and a control device by which, in a case where the display of "degrees" by said design of said display device has been inputted as or validated at a predetermined value having "0" as a value of a lowermost digit by operating said input device, the display of "minutes" by said design of said display device is automatically changed to "00", and by which, when said display of "minutes" has been validated at a desired value by said input device, the respective values are stored in said storage device as said coordinate information on said set location.

5. A navigation apparatus wherein "latitude" and "longitude" are used as coordinate information on a set location, characterized by comprising a positioning device which measures a current position of a mobile object, an input device which sets the set location, a storage device which stores therein the coordinate information on said set location, a display device which includes an azimuth display area for displaying an azimuthal direction in accordance with an azimuth signal, and a distance display area for numerically displaying a movement distance and values of, at least, "degrees" and "minutes" of the "latitude" and the "longitude", and a control device which obtains said azimuthal direction of said set location on the basis of signals from said positioning device and said input device and then outputs said azimuth signal, which calculates a distance between the current position and said set location and then outputs a distance signal, by which, in a case where the display of "degrees" on said display device has been inputted as or validated at a predetermined value by operating said input device, the display of "minutes" on said display device is automatically changed to a preset value, and by which, when said display of "degrees" on said display device has been validated at the predetermined value by said input device, said display of "minutes" on said display device is validated at the preset value, and the respective values are stored in said storage device as said coordinate information on said set location.

6. A navigation apparatus wherein "latitude" and "longitude" are used as coordinate information on a set location, characterized by comprising a positioning device which measures a current position of a mobile object, an input device which sets the set location, a storage device which stores therein the coordinate information on said set location, a display device which includes an azimuth display area having a plurality of azimuth indication patterns arranged radially so that an outer edge defined by their tips may form a circle or a circular arc, so as to display an azimuthal direction in accordance with an azimuth signal, and a distance display area for numerically displaying a movement distance and values of, at least, "degrees" and "minutes" of the "latitude" and the "longitude", and a control device which obtains the azimuthal direction of said set location on the basis of signals from said positioning device and said input device and then outputs the azimuth signal, which calculates a distance between the current position and said set location and then outputs a distance signal, by which, in a case where the display of "degrees" on said display device has been inputted as or validated at a predetermined value by operating said input device, the display of "minutes" on said display device is automatically changed to a preset value, and by which, when said display of "degrees" on said display device has been validated at the predetermined value by said input device, said display of "minutes" on said display device is validated at the preset value, and the respective values are stored in said storage device as said coordinate information on said set location.

7. A navigation apparatus as defined in claim 5 or claim 6, characterized in that said display device includes designs by which, in a case where the "degrees" and "minutes" of said "latitude" are being displayed in the distance display area, the azimuth display area presents a display for indicating the "north latitude" or "south latitude" of said "latitude", while in a case where the "degrees" and "minutes" of said "longitude" are being displayed in said distance display area, said azimuth display area presents a display for indicating the "east longitude" or "west longitude" of said "longitude".

* * * * *